United States Patent
Kozuka

(10) Patent No.: US 10,444,821 B2
(45) Date of Patent: Oct. 15, 2019

(54) INFORMATION PROCESSING APPARATUS HAVING POWER FACTOR CORRECTION CIRCUIT AND CONTROL METHOD FOR THE SAME

(71) Applicant: CANON KABUSHIKI KAISHA, Tokyo (JP)

(72) Inventor: Yasuhiro Kozuka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 15/716,374

(22) Filed: Sep. 26, 2017

(65) Prior Publication Data
US 2018/0095516 A1   Apr. 5, 2018

(30) Foreign Application Priority Data
Sep. 30, 2016  (JP) .................. 2016-192607

(51) Int. Cl.
*G06F 1/32* (2019.01)
*G06F 1/3234* (2019.01)
*G06F 1/3287* (2019.01)
*H02M 7/02* (2006.01)
*H02M 1/42* (2007.01)
*H02M 1/00* (2006.01)

(52) U.S. Cl.
CPC .......... *G06F 1/3284* (2013.01); *G06F 1/3287* (2013.01); *H02M 1/4208* (2013.01); *H02M 1/4225* (2013.01); *H02M 7/02* (2013.01); *H02M 2001/0032* (2013.01); *Y02B 70/126* (2013.01); *Y02B 70/16* (2013.01)

(58) Field of Classification Search
CPC .. G06F 1/3284; G06F 3/1221; H02M 1/4208; Y02B 70/126
See application file for complete search history.

(56) References Cited

U.S. PATENT DOCUMENTS

2012/0075350 A1   3/2012  Matsubara
2012/0075359 A1*  3/2012  Kwak ................. H02M 1/4208
                                                    345/690

(Continued)

FOREIGN PATENT DOCUMENTS

CN          1938932 A    3/2007
CN        101777770 A    7/2010
(Continued)

*Primary Examiner* — Albert Wang
(74) *Attorney, Agent, or Firm* — Canon U.S.A., Inc. IP Division

(57) ABSTRACT

A power supply control unit in a power supply unit in a multi-functional peripheral turns off a PFC unit in a power-saving mode. If a return to a normal mode occurs, whether the PFC unit is to be turned on or not is controlled based on a cause of the return to the normal mode. If the PFC unit is not to be turned on or already has an ON state based on the occurrence of the return, the power supply control unit immediately causes power supply unit to start power supply based on the cause of return. If the PFC unit is turned on based on the occurrence of the return, the power supply control unit causes the power supply unit to start power supply based on the cause of return after a lapse of a delay time from the turning on of the PFC unit.

33 Claims, 10 Drawing Sheets

(56) References Cited

U.S. PATENT DOCUMENTS

| | | | |
|---|---|---|---|
| 2013/0083338 A1* | 4/2013 | Fahrenkrug | G06F 3/1221 |
| | | | 358/1.13 |
| 2013/0305063 A1 | 11/2013 | Shih | |
| 2016/0043634 A1* | 2/2016 | Bemat | H02M 1/4225 |
| | | | 713/300 |

FOREIGN PATENT DOCUMENTS

| | | | |
|---|---|---|---|
| JP | 2006-109605 A | 4/2006 | |
| TW | 201503559 A | 1/2015 | |

* cited by examiner

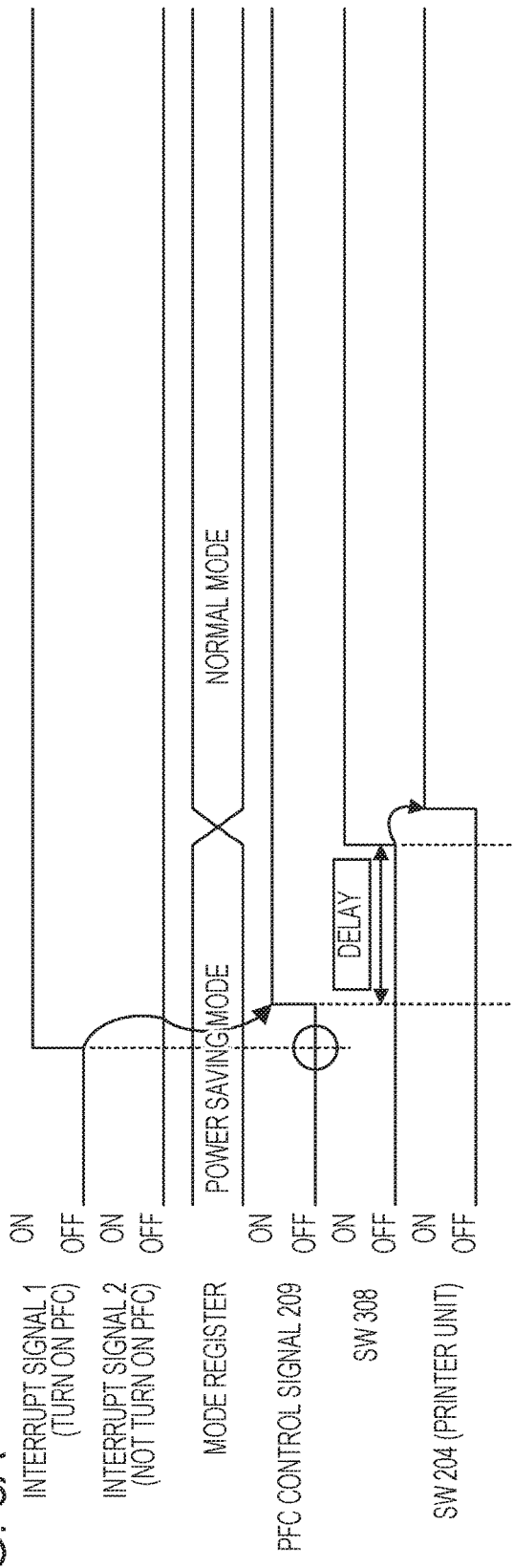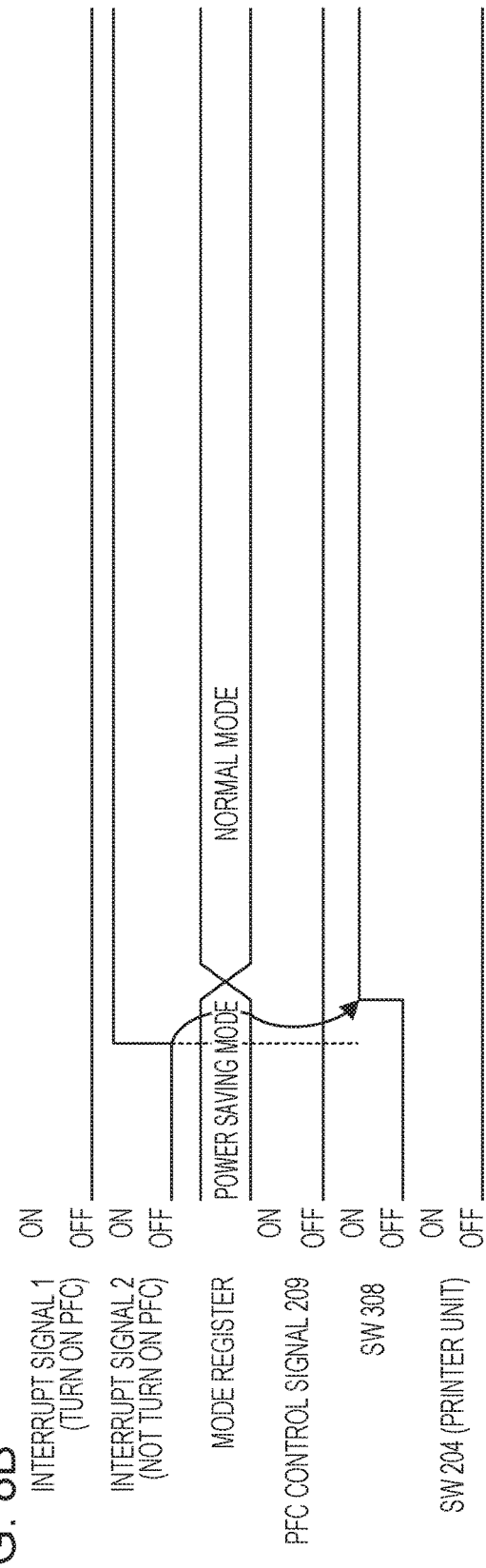

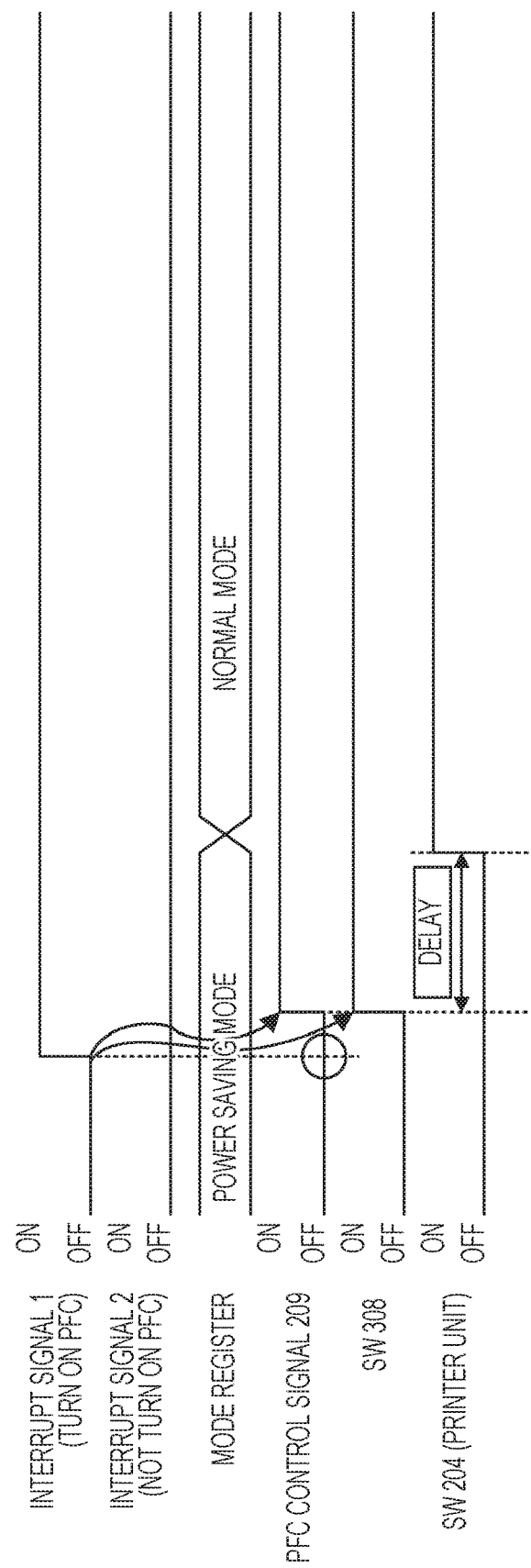

INFORMATION PROCESSING APPARATUS HAVING POWER FACTOR CORRECTION CIRCUIT AND CONTROL METHOD FOR THE SAME

BACKGROUND OF THE INVENTION

Field of the Invention

One disclosed aspect of the embodiments relates to an information processing apparatus having a power factor correction circuit and a control method for the same.

Description of the Related Art

An apparatus receiving power from a commercial power supply, such as a multi-functional peripheral having copy, print, scan, and facsimile functions, may internally include a power supply unit configured to convert commercial power supply to direct current voltage. For example, such a multi-functional peripheral may consume high power of 1 kW (kilowatt) in a state where those functions operate (hereinafter, called a normal mode) and, after a lapse of a predetermined period of time in a standby state in which the functions do not operate continuously, automatically shift from the standby state to a power-saving mode consuming power reduced to 1 W or less. An apparatus such as a multi-functional peripheral includes a power factor correction (hereinafter, called a "PFC") circuit in a power supply unit for improved power factor and harmonic suppression in the whole apparatus.

Japanese Patent Laid-Open No. 2006-109605 proposes a technology which controls ON/OFF of the PFC based on a control signal from outside of a power supply unit in order to reduce the power consumption of the PFC in a power-saving mode. Japanese Patent Laid-Open No. 2006-109605 further proposes a technology which, for acquiring stable power supply output, generates a delay signal for activating a DC/DC converter in a following stage of a PFC circuit included in the power supply unit after the PFC circuit is stabilized and matches the timing of turning on of the PFC circuit and activation of the DC/DC converter.

Normally, the power consumption acceptable when the PFC circuit is turned off is equal to a limited power consumption value, compared with rated power consumption suppliable when the PFC circuit is turned on.

However, in recent years, various kinds of power-saving control may be performed in multi-functional peripherals, and an increased number of multi-functional peripherals have a plurality of stepwise power-saving states in a power-saving mode. There has been a large need for reducing the return time for quickly returning from a standby state and enabling to perform a target operation based on a cause of return. Accordingly, the PFC may be turned off without fail in the power-saving mode, and the PFC may be turned on without fail upon return to the normal mode. However, activating the DC/DC converter after a delay of a predetermined period of time may take a wastefully longer return time.

For example, in response to an inquiry for information within the apparatus over a network, a part associated with a response to the inquiry may only be electrified, and the power supply state may be returned to the original power-saving standby state after responding. Also in this case, a certain delay time may be provided for activating the DC/DC converter, which also wastefully needs a time before the responding.

SUMMARY OF THE INVENTION

An aspect of the embodiments was made in view of the problems. One embodiment provides a mechanism which can provide an apparatus balancing power-saving and return time from a power-saving state.

According to an aspect of the embodiments, an information processing apparatus includes a power supply unit and a power supply control unit. The power supply unit has an ON/OFF switchable power factor correction circuit. The power supply unit is configured to supply power to a predetermined load in the information processing apparatus. The power supply control unit is configured to control such that power is supplied from the power supply unit to the predetermined load in response to input of a signal for returning the information processing apparatus from a power-saving state stopping power supply to the predetermined load. In this case, the power supply control unit determines whether the power factor correction circuit is to be turned on or not based on a cause of return of the information processing apparatus from the power-saving state.

Further features of the disclosure will become apparent from the following description of exemplary embodiments with reference to the attached drawings.

BRIEF DESCRIPTION OF THE DRAWINGS

FIGS. 8A and 8B are timing charts in response to a return interrupt signal according to the first embodiment.

FIG. 10 is a timing chart in response to a return interrupt signal according to the second embodiment.

DESCRIPTION OF THE EMBODIMENTS

Modes for embodying the disclosure will be described below with reference to drawings.

First Embodiment

Figure 1:
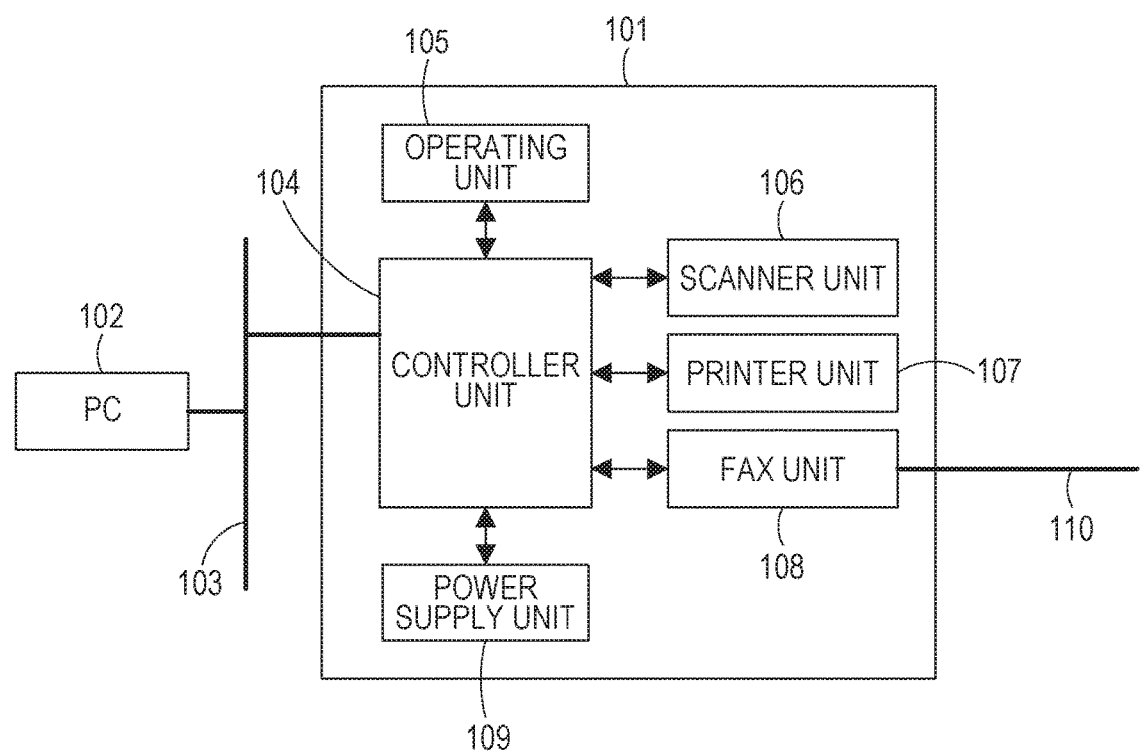
FIG. 1 illustrates a configuration of a system including a multi-functional peripheral according to an embodiment.

FIG. 1 illustrates a configuration of a system including a multi-functional peripheral illustrating an embodiment.

A multi-functional peripheral 101 is connected to a PC 102 over a network 103. The PC 102 is a computer and can transmit and receive data to and from the multi-functional peripheral 101. The multi-functional peripheral 101 incorporates copy, printer, scanner, and facsimile functions and has multi-functionality.

Next, a schematic configuration of and operations to be performed by the multi-functional peripheral 101 will be described.

The operating unit 105 may include switches usable by an operator to perform operations and may include a control panel and a display unit configured to display operation information, for example.

A scanner unit 106 includes a mechanism configured to scan an original image, convert it to digital data, and input to the controller unit 104. A printer unit 107 is configured to print, on paper, image data processed by the controller unit 104 for output. A facsimile unit 108 is connected to a telephone line 110 and includes functions to facsimile-transmit a document scanned by the scanner unit 106 and print, by the printer unit 107, the facsimile data received from the telephone line 110 for output.

The controller unit 104 is configured to generally control the multi-functional peripheral 101 and implement the functions. A power supply unit 109 is a power supply for the multi-functional peripheral 101 and is configured to convert alternating-current power supply to direct-current power supply and to supply power to the components within the multi-functional peripheral 101.

Figure 2:
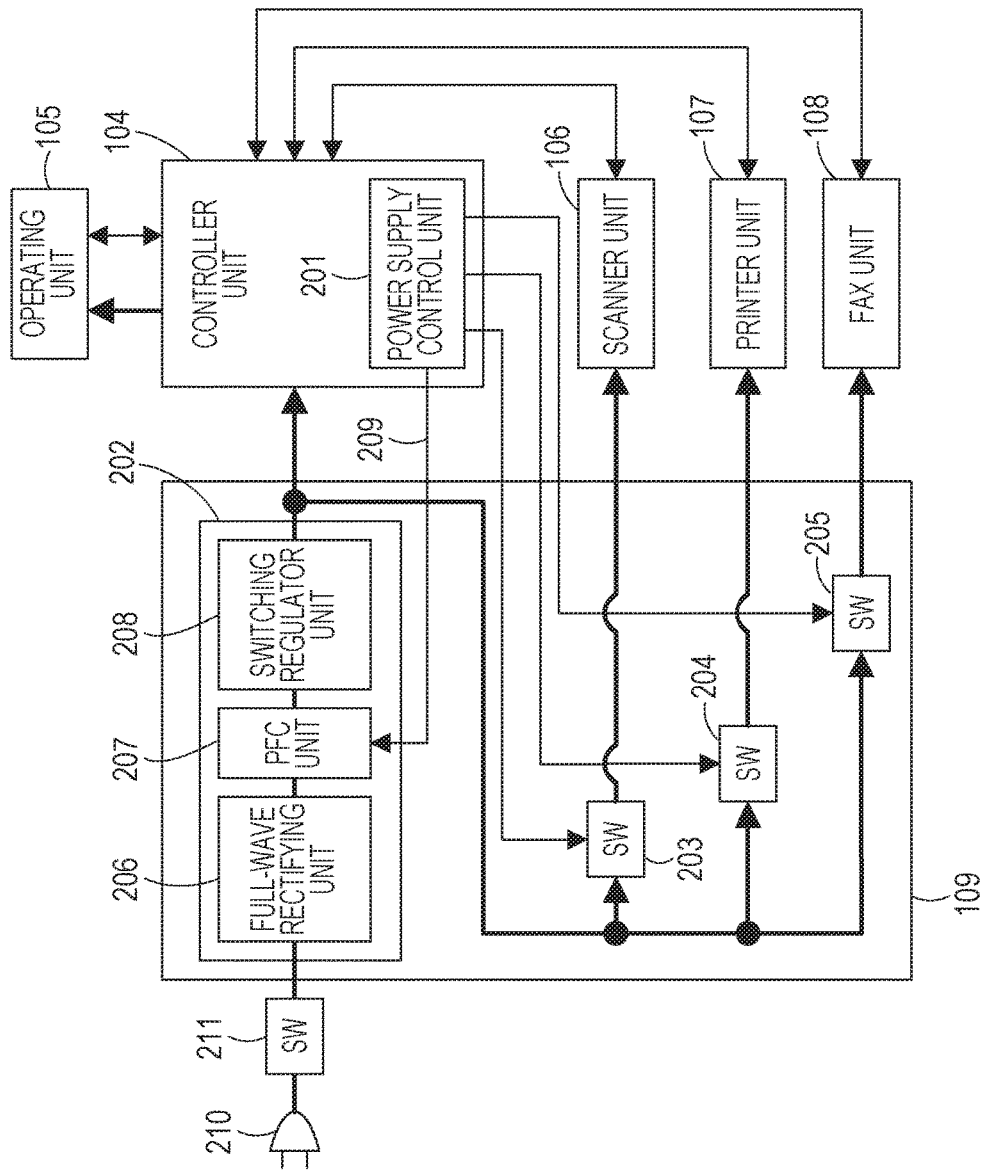
FIG. 2 is a block diagram illustrating an internal arrangement of a power supply unit.

FIG. 2 is a block diagram mainly illustrating an internal arrangement of the power supply unit 109.

When the power switch 211 has an ON state, commercial alternating-current power is supplied from a power supply plug 210 to a power supply unit 202 within the power supply unit 109.

The power supply unit 202 generates direct-current power from alternating-current power. The direct-current power generated by the power supply unit 202 is supplied to the controller unit 104 and the operating unit 105. The direct-current power generated by the power supply unit 202 is supplied to the scanner unit 106, the printer unit 107, and the facsimile unit 108 through switches (SW) 203, 204, and 205. The switches 203, 204, and 205 are controlled to have an OFF/ON state by the power supply control unit 201 within the controller unit 104.

The power supplies to the components within the multi-functional peripheral 101 are turned ON/OFF based on an operation performed on the whole multi-functional peripheral 101 so that detail power controls can be executed.

For example, for transition from a normal mode to a power-saving mode for reducing power consumption, the power supply control unit 201 controls to turn off the switches 203, 204, and 205 so that power supply to the scanner unit 106, the printer unit 107, and the facsimile unit 108 can be stopped. It is assumed here that, for the facsimile unit 108, power is supplied only to the part for detecting an incoming call from the telephone line 110 in the power-saving mode.

The power supply unit 202 has a full-wave rectifying unit 206 configured to perform full-wave rectification on alternating-current power supply, a PFC unit 207 configured to improve a power factor of an output from the full-wave rectifying unit 206, and a switching regulator unit 208 configured to perform conversion to a target voltage. Here, the term "PFC" stands for Power Factor Correction and is a circuit (power factor correction circuit) configured to improve a power factor by shaping turbulence of electric current waveforms of input alternating-current power supply to bring them closer to a voltage waveform. The PFC can reduce the harmonics content of a power supply line for prevention of occurrence of noise failure and improved power consumption efficiency.

The PFC unit 207 receives a PFC control signal 209 from the power supply control unit 201 and can switch on/off a PFC operation based on the PFC control signal 209. In the normal mode which largely consumes power, the PFC has an ON state. On the other hand, in the power-saving mode which consumes less power and in which an influence of a loss due to the PFC is not ignorable, the power in the apparatus is small, and there is little adverse effects due to harmonics content. Therefore, it is assumed that the PFC has an OFF state.

However, it is guaranteed to use power lower than a limited value equal to or lower than rated power with the PFC having an OFF state in the power-saving mode. If the power is lower than the limited value, a DC/DC at a limited partial region can be activated from the power-saving mode even when the PFC keeps its OFF state. In other words, the power supply unit 202 is a power supply unit which can reduce power consumption under a low load where the power consumption is lower than a certain value. Whether there is possibility that power consumption will be higher than a certain value or not may be determined by monitoring the state of the apparatus by the power supply control unit 201 (details of which will be described below).

Figure 3:
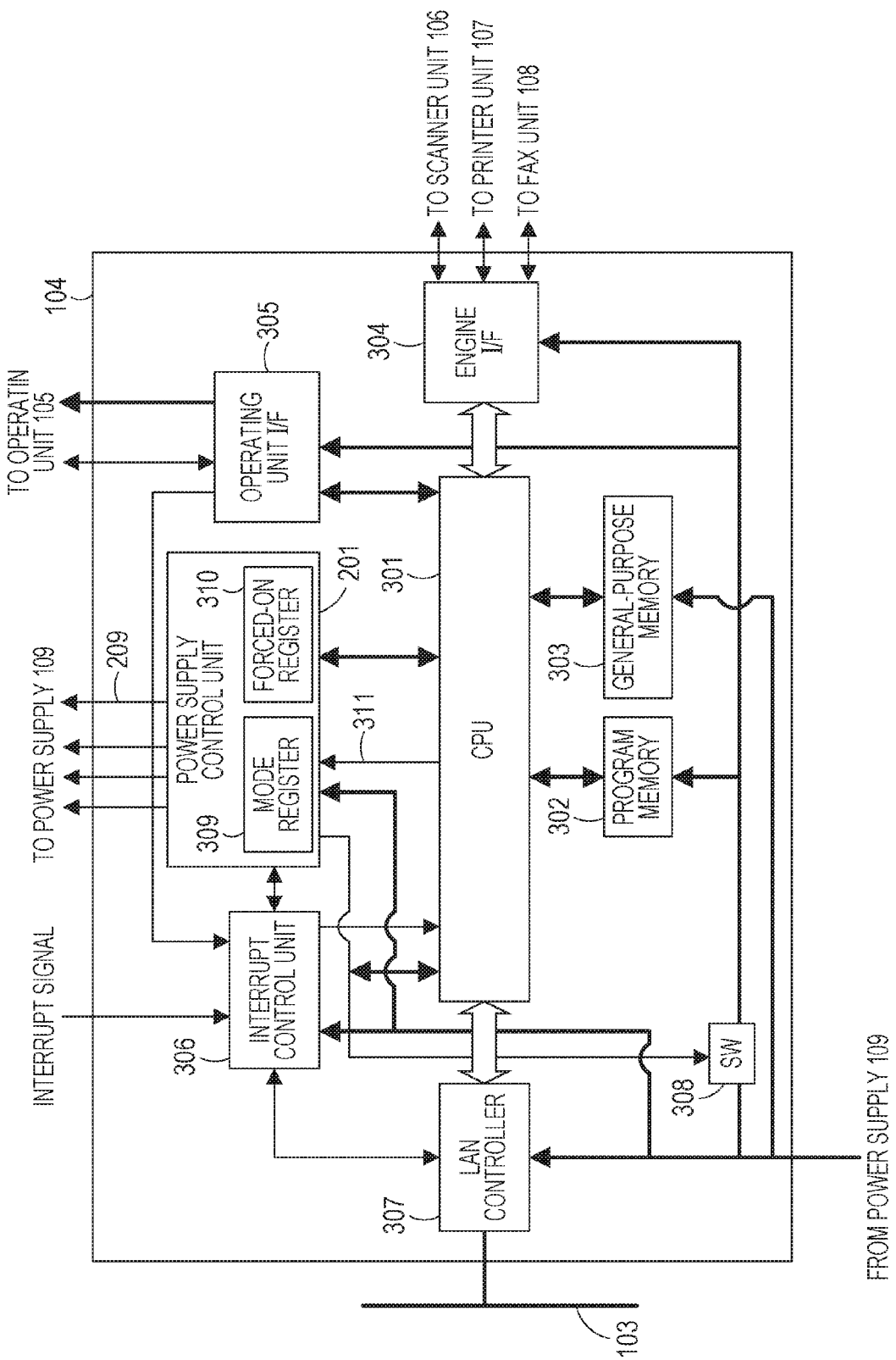
FIG. 3 is a block diagram illustrating an internal arrangement of a controller unit.

FIG. 3 is a block diagram illustrating an internal arrangement of the controller unit 104.

The controller unit 104 has a CPU 301, a program memory 302, a general-purpose memory 303, an engine I/F 304, an operating unit I/F 305, an interrupt control unit 306, a LAN controller 307, a power supply control unit 201, and a switch 308.

The CPU 301 may be connected to the engine I/F 304 and the LAN controller 307 through a PCI Express bus, for example. The CPU 301 includes an interface circuit to a peripheral device and is configured to execute a program stored in the program memory 302 and generally control the multi-functional peripheral 101.

The program memory 302 is configured to store a program controlling the multi-functional peripheral 101 and control data. The general-purpose memory 303 may be usable as a work memory for the CPU 301 and is configured to store image data corresponding to a target unit based on a processing mode such as copy, scan, print, and facsimile modes.

The engine I/F 304 is connected to the scanner unit 106, the printer unit 107, and the facsimile unit 108 and is configured to perform communication controls and transmit and receive image data. The operating unit I/F 305 is an interface for connection to the operating unit 105 and is configured to communicate information regarding an operation on a key or a touch panel in the operating unit 105 and transmit screen data to be displayed on the operating unit 105. The LAN controller 307 is a network control unit connected to the network 103 and is configured to respond to an external apparatus such as the PC 102 over the network.

The interrupt control unit 306 is configured to detect a signal input from the operating unit 105 through the operating unit I/F 305, a signal from an external apparatus connected to the network 103 through the LAN controller 307, and other interrupt signals from components within the apparatus and notifies to the power supply control unit 201 and the CPU 301 based on a cause of interrupt.

The switch 308 is a switch for enabling to shut off power supplied from the power supply unit 109 under control of the power supply control unit 201 in the power-saving mode. The switch 308 may be turned off to shut off power to the CPU 301, the program memory 302, the engine I/F 304, the operating unit I/F 305, and the operating unit 105. In this case, information held in the CPU 301 is saved in the general-purpose memory 303, and the general-purpose memory 303 is shifted to a self-refresh state so that the data can be held in a low power consumption state. In the operating unit I/F 305 and the operating unit 105, power is supplied at all times to a part for detecting a user's return operation (such as a press of a power-saving button, not illustrated) on the operating unit 105 even in the power-saving mode.

A mode register 309 provided within the power supply control unit 201 is usable for informing, by the CPU 301, the power state (power mode) of the multi-functional peripheral 101 to the power supply control unit 201 based on a power supply control program within the program memory 302. According to this embodiment, the mode register 309 can take a value of "normal mode" or "power-saving mode". A state in which the CPU 301 is activated to be able to control is defined as the "normal mode", and a state in which the CPU 301 has a power supply OFF or sleep mode not to be able to control is defined as "power-saving mode". The power supply control unit 201 is configured to control the switches 203, 204, 205, and 308 based on the value of the mode register 309.

A forced ON register 310 provided in the power supply control unit 201 is a register in which the CPU 301 stores a flag for forcibly turning on the PFC circuit in a case where a predetermined assumed power value upon change of settings or initialization of the system is higher than acceptable power consumption when the PFC unit 207 is turned off. For example, in a case where a slave telephone option of the facsimile unit 108 is set, the flag may be set in the forced ON register 310 by the CPU 301 when a user defines settings so that the PFC unit 207 can be turned on irrespective of the value of the mode register 309. In a case where the forced ON register 310 has an OFF state and the mode register 309 is in the power-saving mode, the multi-functional peripheral 101 waits with the PFC unit 207 in an OFF state.

A state notification signal 311 represents a state of the CPU 301. According to this embodiment, the state notification signal 311 is usable for notifying that the CPU 301 actually shifts to the normal mode or the power-saving mode after setting the register 309.

Figure 4:
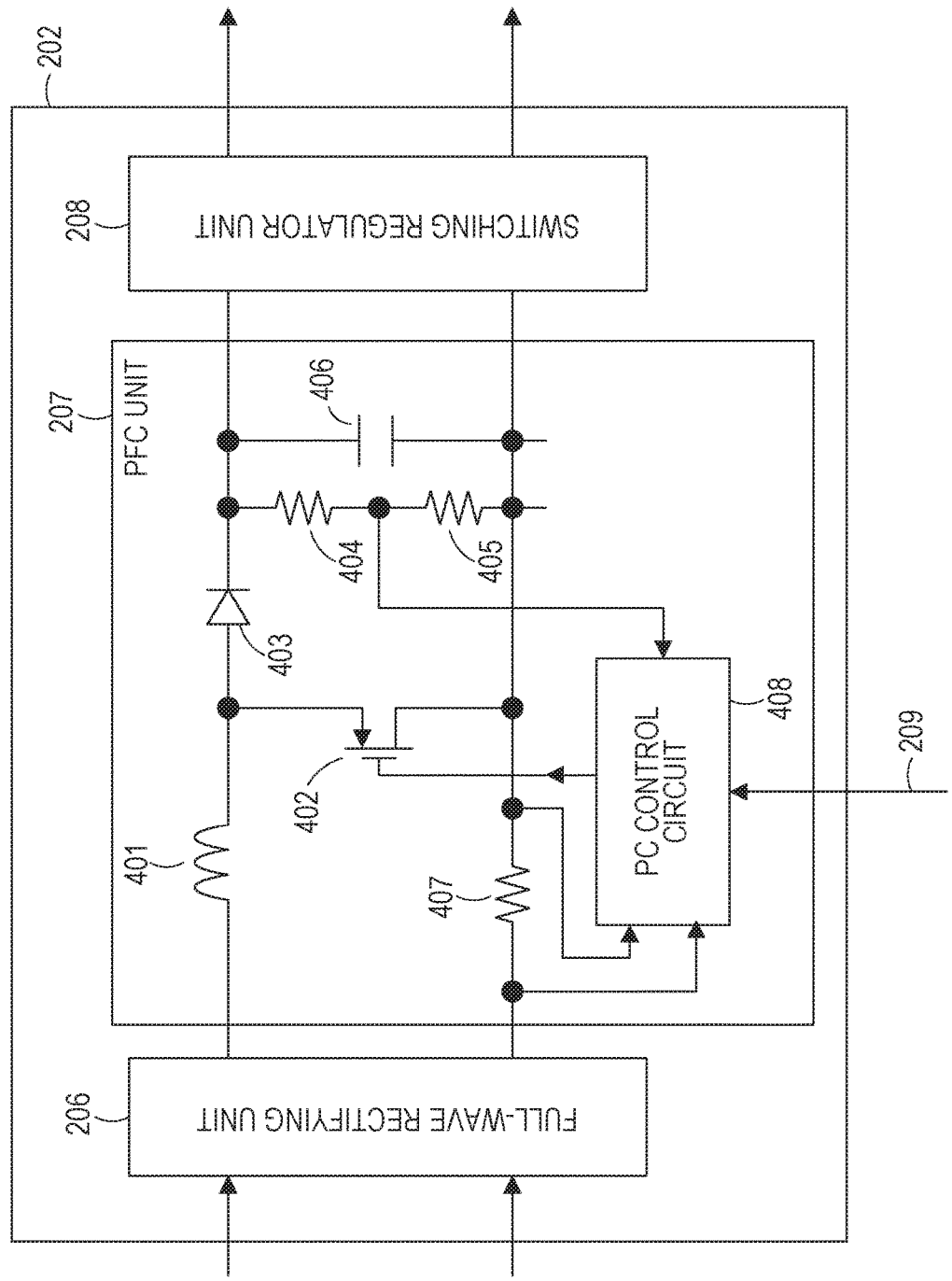
FIG. 4 is a block diagram illustrating an internal arrangement of a power supply unit.

FIG. 4 is a block diagram illustrating an internal arrangement of the power supply unit 202 and particularly illustrates a configuration of the PFC unit 207 in detail.

When alternating-current power supply is input to the full-wave rectifying unit 206, the full-wave rectifying unit 206 outputs a rectified pulsating voltage waveform to the PFC unit 207. A PFC control circuit 408 controls to turn off and on the FET 402 such that an electric current waveform can be synchronized with a voltage waveform. When an FET 402 has an ON state, power is stored in a choke coil 401. When the FET 402 has an OFF state, the power stored in the choke coil 401 is supplied to a primary smoothing capacitor 406 through a diode 403 to adjust the electric current waveform. The PFC control circuit 408 monitors the value of voltage divided by partial resistances 404 and 405 and the value of electric current fed to the electrical resistance 407 for control over the FET 402. When the PFC control signal 209 is turned on, the FET 402 is controlled to turn off and on. When the PFC control signal 209 is turned off, the FET 402 is turned off. This stops the PFC operation.

In other words, the power supply unit 202 includes a power factor correction circuit (PFC unit 207) which can be turned on and off under control of the power supply control unit 201.

Figure 5:
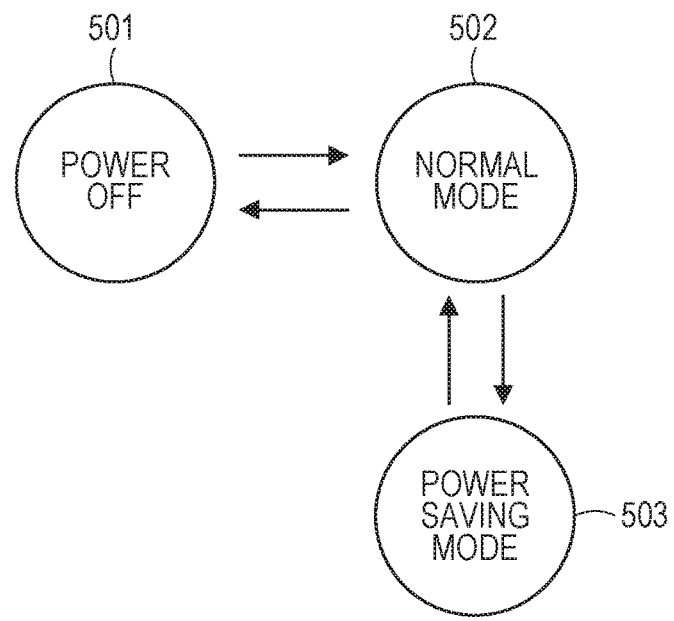
FIG. 5 is a state transition diagram of a power mode in a multi-functional peripheral.

FIG. 5 is a state transition diagram of the power mode of the multi-functional peripheral 101.

According to this embodiment, the multi-functional peripheral 101 can have power states of at least "power supply OFF", "normal mode", and "power-saving mode".

In the state "power supply OFF" 501, the power switch 211 of the multi-functional peripheral 101 is turned off so that power supply to the components is shut off. When the power switch 211 is turned on, the multi-functional peripheral 101 shifts to the "normal mode" 502. In the "normal mode" 502, power is supplied to inside of the multi-functional peripheral 101, and one of copy, print, facsimile jobs is being executed, or it is ready for executing the job. For power state transition of the multi-functional peripheral 101 in the "normal mode" 502, the CPU 301 controls the power supply control unit 201 based on a program within the program memory 302.

A transition condition from the "normal mode" 502 to the "power-saving mode" 503 may be after completion of a copy, scan, print, or facsimile job, for example, or after a lapse of a predetermined period of time from the last operation on the operating unit 105.

In the "power-saving mode" 503, the switches 203, 204, and 205 in the power supply unit 109 and the switch 308 in the controller unit 104 are turned off, and a part of the controller unit 104 only receives power supply. More specifically, power is only supplied to the general-purpose memory 303, power supply control unit 201, interrupt control unit 306, and LAN controller 307 in FIG. 3 and an incoming call detecting unit in the facsimile unit 108. The general-purpose memory 303 is shifted to a self-refresh mode to reduce power consumption.

Next, a control method for the PFC unit 207 according to the first embodiment will be described.

According to this embodiment, the PFC control signal 209 basically performs an ON control in the "normal mode" 502 and performs an OFF control to reduce loss in the PFC unit 207 in the "power-saving mode" 503.

However, in a case where the multi-functional peripheral 101 is returned from the "power-saving mode" 503 to the "normal mode" 502 in response to an external status inquiry to the multi-functional peripheral 101 over the network 103, a part of the controller unit 104 is electrified to respond without feeding power to the scanner unit 106, the printer unit 107, and the facsimile unit 108 which largely consume power. In other words, when some cause of return is input in the power-saving state, the power supply control unit 201 controls the switch 203, the switch 204, the switch 205, and the switch 308 based on the cause of return and controls the PFC control signal 209 based on the cause of return.

In this way, in the multi-functional peripheral 101, based on a cause of return, the power-saving mode can be kept by assuming the power state to which the apparatus shifts and keeping the PFC control signal 209 having an OFF state so that more effective power control can be implemented.

A predefine delay time is to be provided from a change of the PFC control signal 209 to a time when the power supply unit 202 is ready for outputting rated power. For that, delay control over the switches is to be performed when the PFC control signal 209 is changed.

Table 1 is a control table for the PFC control signal 209 based on cause of returns (PFC control table based on cause of returns).

TABLE 1

PFC CONTROL TABLE
FOR CAUSE OF RETURN

| CAUSE OF RETURN | PFC CONTROL (1: ON/0: OFF) |
|---|---|
| PRESS OF POWER SAVING BUTTON (RETURN TO NORMAL MODE) | 1 |
| RECEPTION OF FAX DATA | 1 |
| NETWORK INQUIRY | 0 |
| NETWORK PRINT JOB | 1 |
| WIFI INQUIRY | 0 |
| WIFI PRINT JOB | 1 |

The ON/OFF control of the PFC control signal 209 as described above keeps the power-saving state by keeping the PFC unit 207 having an OFF state if a power value based on a cause of return is equal to or lower than a threshold value which is a power value (such as approximately 20 W against a rated power value of 1000 W) acceptable when the PFC unit 207 is turned off and controls to turn on the PFC unit 207 if the value is equal to or higher than the threshold value. According to this embodiment, for example, in a case where only the controller unit 104 can be electrified to respond like a return based on a cause of return of network inquiry, the responding is performed by keeping the PFC having an OFF state. The PFC is to be turned on when, for example, the printer unit 107 consuming large power for a network print job, for example, is to be electrified.

Figure 6:
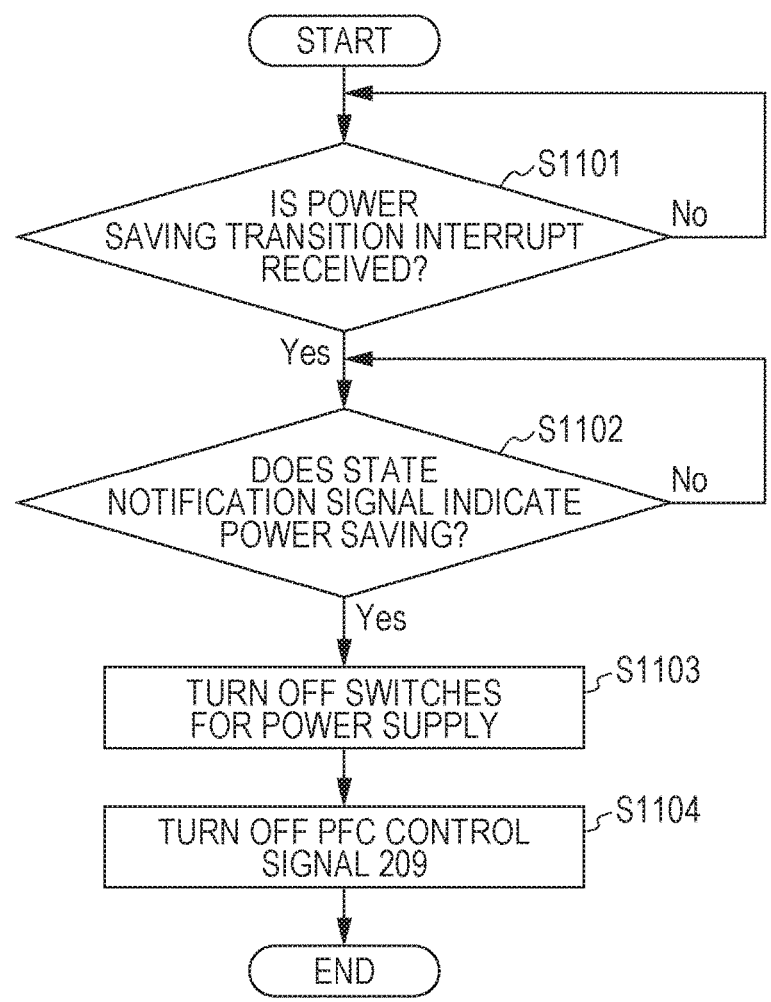
FIG. 6 is a flowchart illustrating operations to be performed by a power supply control unit for transition to a power-saving mode.

FIG. 6 is a flowchart illustrating operations to be performed by the power supply control unit 201 for transition from the normal mode to the power-saving mode. For example, the power supply control unit 201 may include a CPLD (Complex Programmable Logic Device) and a microcomputer, and the power supply control unit 201 may operate based on internally stored circuit information and programs so that the processing illustrated in FIGS. 6 and 7, which will be described below can be implemented.

If, in S1101, the power supply control unit 201 receives an interrupt for transition to the power-saving state from the interrupt control unit 306 (Yes in S1101), the processing moves to S1102.

In S1102, the power supply control unit 201 waits until the state notification signal 311 shifts to the "power-saving mode". If it is determined that the state notification signal 311 shifts to the "power-saving mode" (Yes in S1102), the power supply control unit 201 moves to processing in S1103.

In S1103, the power supply control unit 201 turns off the switches 203, 204, 205, and 308. This shuts off the power supply to the components.

Next, in 51104, the power supply control unit 201 turns off the PFC control signal 209, and the processing on this flowchart ends.

Figure 7:
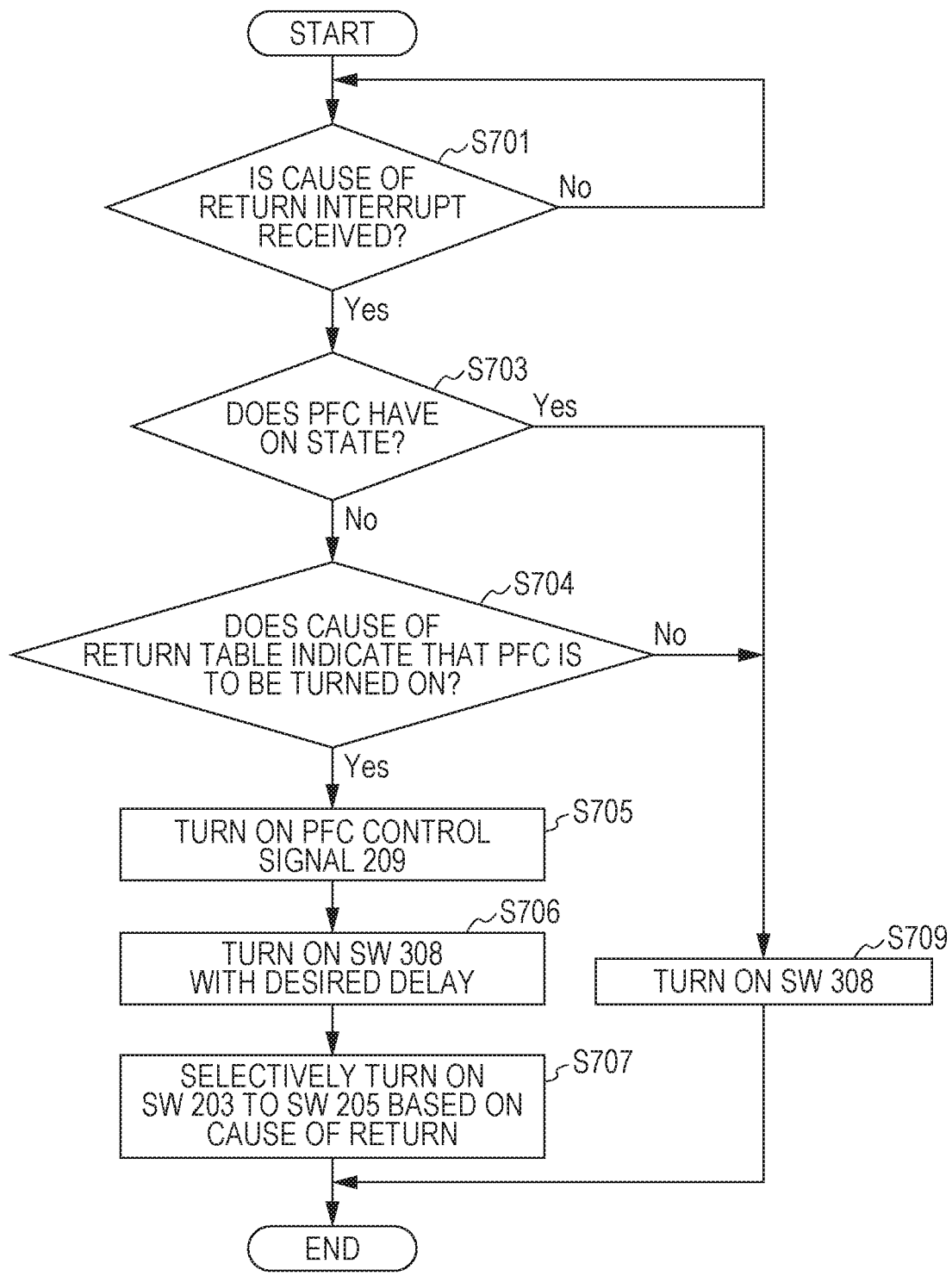
FIG. 7 is a flowchart illustrating operations to be performed for transition to a normal mode according to a first embodiment.

FIG. 7 is a flowchart illustrating operations to be performed by the power supply control unit 201 for transition from the power-saving mode to the normal mode according to the first embodiment.

If the power supply control unit 201 in S701 receives a cause of return interrupt from the interrupt control unit 306 (Yes in S701), the processing moves to S703.

In S703, the power supply control unit 201 checks a PFC control state. If it is determined that the PFC control state has an OFF state (No in S703), the power supply control unit 201 advances the processing to S704.

In S704, the power supply control unit 201 determines whether the cause is associated with the turning on of the PFC unit 207 or not based on the cause of return table in Table 1. If it is determined that the cause is associated with the turning on of the PFC unit 207 (Yes in S704), the power supply control unit 201 advances the processing to S705.

In S705, the power supply control unit 201 turns on the PFC control signal 209.

Next, in S706, the power supply control unit 201 turns on the switch 308 after a lapse of a delay time predefined for the power supply unit 202 from the time when the PFC unit 207 is turned on and activates the CPU 301. Here, the "predefined delay time" depends on the power supply unit and is generally appropriately equal to several 100 ms. A delay time may be added by delaying a control signal for the switch 308 through a delay circuit within the power supply control unit 201 or by using an internal timer.

Next, in S707, the power supply control unit 201 turns on the corresponding switch based on a cause of return. For example, for a network print job, the switch 204 is turned on, and the printer unit 107 is activated. After the processing in S707, the power supply control unit 201 exits the processing on the flowchart.

If it is determined in S703 that the PFC control state is ON (Yes in S703), the power supply control unit 201 advances the processing to S709.

If it is determined in S704 that the cause of return is not associated with the turning on of the PFC (No in S704), the power supply control unit 201 also advances the processing to S709.

In S709, the power supply control unit 201 turns on the switch 308. In this case, because the PFC control signal 209 is not changed, the switch 308 can be turned on immediately without the "predefined delay time in the power supply unit 202". After the processing in S709, the power supply control unit 201 exits the processing on this flowchart.

FIGS. 8A and 8B are timing charts on which the system receives a return interrupt signal in the power-saving mode according to the first embodiment. For convenience of description, there are two groups of interrupt signals for one of which the PFC unit 207 is to be turned on (called an interrupt signal 1) and for the other of which it is not to be turned on (called an interrupt signal 2).

For an exemplary interrupt signal 1, power is to be supplied to the printer unit 107 for a network print job, for example. FIG. 8A illustrates the example.

An exemplary interrupt signal 2 may activate the controller unit 104 only to respond to a network inquiry. FIG. 8B illustrates the example.

The network print job and network inquiry determinations according to this embodiment are performed by a microcomputer within the LAN controller 307 and are input to the interrupt control unit 306 as dedicated interrupt signals thereof.

As illustrated in FIG. 8A, if the power supply control unit 201 receives the interrupt signal 1, a control is performed to turn on the switch 308 and turn on the switch 204 after a lapse of a predefined delay time in the power supply unit 202 from the turning on of the PFC control signal 209. In other words, in this case, the power supply control unit 201 performs a control to start power supply to the CPU 301, the printer unit 107, and the like after a lapse of the predetermined time delay from the turning on of the PFC unit 207.

As illustrated in FIG. 8B, if the power supply control unit 201 receives the interrupt signal 2, a control is performed to turn on the switch 308 immediately without the turning on of the PFC control signal 209. In other words, in this case, the power supply control unit 201 performs a control to start power supply to the CPU 301 without the turning on of the PFC unit 207.

According to this embodiment, as described above, in response to a cause of return interrupt, the power supply control unit 201 controls timing for supplying power to a target region based on whether a cause of return interrupt exceeds an acceptable power value in a PFC OFF state or not and based on the PFC control state upon occurrence of the return. Thus, the control timing specifications from the turning on of the PFC circuit to power output can be complied, and, at the same time, power-saving and return time can be improved even upon state transition between the power-saving mode and the normal mode in the system.

For simple descriptions, two modes of the "normal mode" 502 and the "power-saving mode" 503 in the mode register 309 are described according to this embodiment. It is assumed here that the normal mode turns on the PFC control, and two or more types of power-saving mode may be provided.

Having described a case where a cause of return is received in the power-saving mode according to this embodiment, an embodiment is applicable to a case where a cause of return is received in the normal mode.

For example, in a case where the interrupt signal (network print job interrupt) is received after return to the normal mode in response to the interrupt signal 2 (network inquiry interrupt), processing similar to that of the flowchart in FIG. 7 may determine the ON state of the PFC or whether a given cause of return is associated with turning on of the PFC and perform delay control on the timing for turning on the PFC and for turning on the SW 308, the SW 204 and so on. In other words, the timing for power supply to a target region is controlled based on whether a cause of return interrupt received by the power supply control unit 201 exceeds an acceptable power value in a PFC OFF state and based on the PFC control state upon occurrence of the return, independent of the normal mode and the power-saving mode. Thus, the control timing specifications from the turning on of the PFC circuit to power output can be complied, and, at the same time, power state transition time can be improved even upon state transition in the system such as the system power state.

Second Embodiment

According to the first embodiment, when the PFC control state is OFF upon occurrence of a return and if a cause of return interrupt exceeds an acceptable power value at a PFC OFF state, the control timing specifications from the turning on of the PFC unit 207 including the switch 308 within the controller unit 104 to power supply output are complied.

According to a second embodiment, in a case where the PFC unit 207 is to be controlled, power supply up to a part tolerable when the PFC unit 207 has an OFF state, such as the components within the controller unit 104, is turned on immediately after a cause of return is detected, and the other part to be involved in the return, such as the printer unit 107 consuming large power undergoes predefined timing control performed by the PFC unit 207, which can further improve the return time.

The second embodiment will be described in detail.

Because descriptions on system configuration block diagrams and state transition diagrams according to the second embodiment are equivalent to those of the first embodiment, they are omitted. Differences from the first embodiment will mainly be described.

Figure 9:
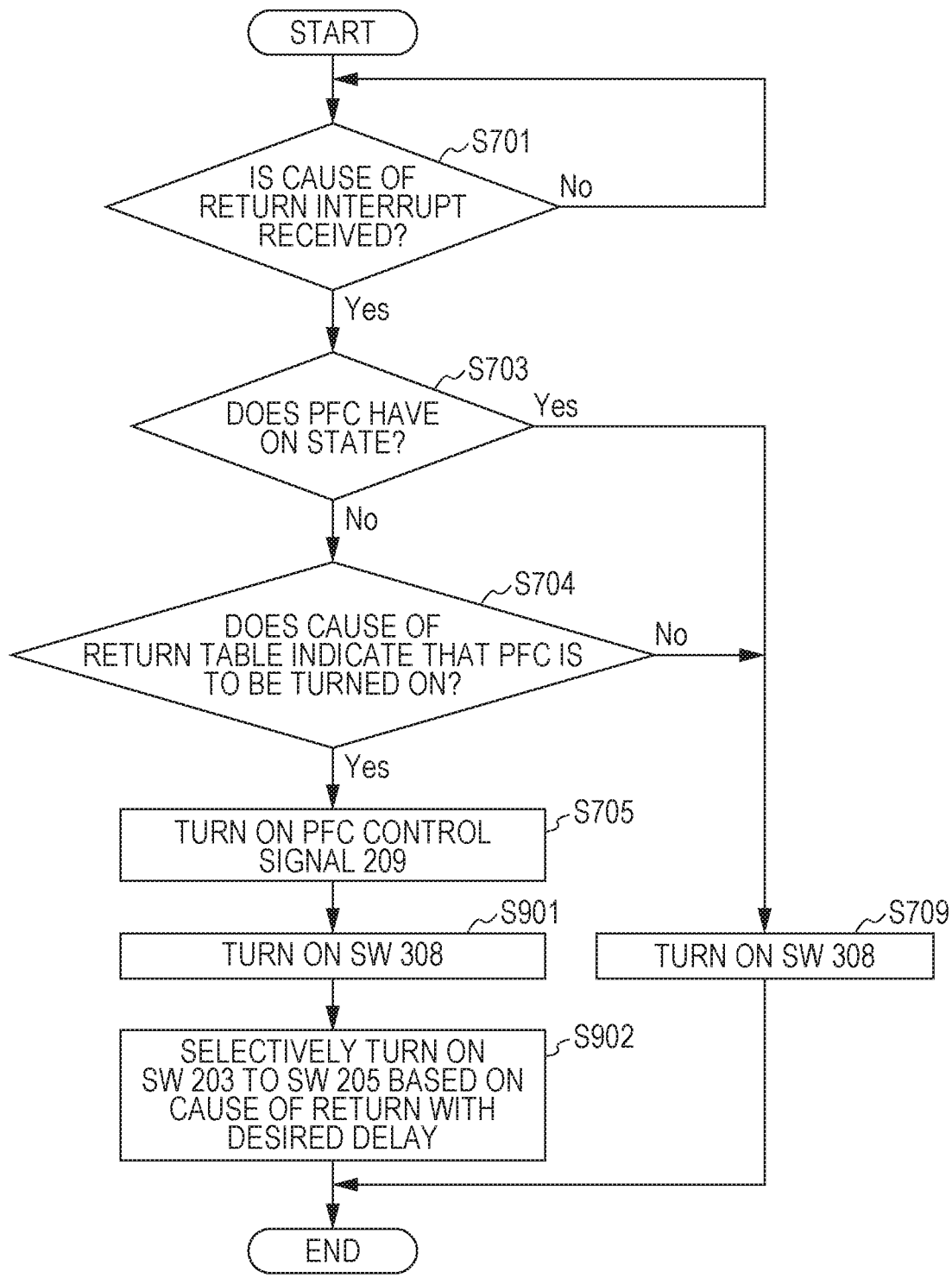
FIG. 9 is a flowchart illustrating operates to be performed for transition to a normal mode according to a second embodiment.

FIG. 9 is a flowchart in the power supply control unit 201 for transition from the power-saving mode to the normal mode according to the second embodiment. The processing on the flowchart is implemented operations to be performed by the power supply control unit 201 based on internally stored circuit information and programs.

Because the processing in S701 to S705 is the same as the one of the first embodiment, any repetitive description will be omitted.

The power supply control unit 201 turns on the PFC control signal 209 in S705 and turns on the switch 308 in S901.

Next, in S902, the power supply control unit 201 turns on the switch corresponding to the cause of return after a predefined delay time in the power supply unit 202 from the turning on of the PFC unit 207. Because the rest of the processing is the same as that of the first embodiment, any repetitive description will be omitted.

In other words, the power supply control unit 201 turns on the switch 308 immediately after the turning on of the PFC unit 207 and activates the CPU 301 and so on. However, power supply to a part consuming large power is controlled to be executed after a predefined delay of the PFC unit 207.

FIG. 10 is a timing chart where the system receives a return interrupt signal in a power-saving mode according to the second embodiment. Here, for the interrupt signal (interrupt signal 1), the PFC unit 207 is to be turned on. Because processing for the signal (interrupt signal 2) for which the PFC unit 207 is not to be turned on is the same as the one illustrated in FIG. 8B according to the first embodiment, any repetitive descriptions will be omitted.

Referring to FIG. 10, according to the second embodiment, the power supply control unit 201 in response to the interrupt signal 1 performs a control to turn on the PFC control signal 209, turn on the switch 308 immediately after that, and turn on the switch 204 after a lapse of a predefined delay time in the power supply unit 202. In other words, in this case, the power supply control unit 201 performs a control to turn on the PFC unit 207 to activate the CPU 301 and start power supply to the printer unit 107 after a lapse of a predetermined time delay from the turning on of the PFC unit 207.

According to the second embodiment, as described above, in response to a cause of return interrupt, the power supply control unit 201 controls timing for supplying power to a target function unit based on whether a cause of return interrupt exceeds an acceptable power value in a PFC OFF state or not and based on the PFC control state upon occurrence of the return. In particular, in a case where there are a plurality of parts to which power is to be supplied based on a cause of return, the power supply may be performed simultaneously with the PFC control signal 209 such that the total required power value does not exceed an acceptable power value when the PFC has an OFF state. This can reduce the return time more. According to this embodiment, the switch 308 within the controller unit 104 is turned on immediately so that partial processing of a network print job can be performed at an earlier stage than that of the first embodiment.

Having described a cause of return is received in the power-saving mode according to this embodiment, an embodiment is also applicable to a case where a cause of return is received in the normal mode.

For example, in a case where the interrupt signal (interrupt for a network print job) is received after return to the normal mode in response to the interrupt signal 2 (interrupt for a network inquiry), the same processing as that on the flowchart in FIG. 7 may be performed to determine the ON state of the PFC and whether the cause of return is associated with the ON state of the PFC, for example, and perform delay control over the timing of the turning on of the PFC and the turning on of the SW 204 and so on. In other words, the timing for power supply to a target region is controlled based on whether a cause of return interrupt received by the power supply control unit 201 exceeds an acceptable power value in a PFC OFF state and based on the PFC control state upon occurrence of the return, independent of the normal mode and the power-saving mode. Thus, the control timing specifications from the turning on of the PFC circuit to power output exceeding the acceptable power value when the PFC has an OFF state can be complied, and, at the same time, power state transition time can be improved even upon state transition in the system such as the system power state.

According to the aforementioned embodiments, in a case where the power state of the system is shifted, for example, for returning from the power-saving mode, to comply with the power supply specifications for protection of the PFC circuit, whether a delay is to be given or not is selectively controlled based on the cause of transition to reduce the return time when the delay is not necessary because delaying the turning on of the power supply circuit also delays the activation time. Thus, an apparatus can be provided including a PFC circuit to be turned off in the power-saving mode for reduction of power consumption and in which timing control is performed over the ON/OFF timing in the PFC circuit and the ON OFF timing in the power supply circuit as required by complying with the timing rules for the PFC circuit are complied when the PFC circuit is to be turned on for balancing power-saving and the time for transition of the power state.

Having described the multi-functional peripheral according to the aforementioned embodiments, the disclosure is not limited to an image forming apparatus such as a multi-functional peripheral but is applicable to an information processing apparatus capable of switching the power state between a power-saving state and a plurality of power states consuming larger power than the power-saving state.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-192607 filed Sep. 30, 2016, which is hereby incorporated by reference herein in its entirety.

What is claimed is:

1. An information processing apparatus, comprising:
a power supply unit having an ON/OFF switchable power factor correction circuit, the power supply unit being configured to supply power to a predetermined load in the information processing apparatus; and
a power supply control unit configured to control such that power is supplied from the power supply unit to the predetermined load in accordance with input of a signal for returning the information processing apparatus from a power-saving state stopping power supply to the predetermined load,
wherein the power supply control unit determines whether the power factor correction circuit is to be turned on or not based on a cause of return of the information processing apparatus from the power-saving state, and controls to turn on the power factor correction circuit in a case where it is determined that the power factor correction circuit is to be turned on so that power can be supplied from the power supply unit to the predetermined load after a lapse of a predetermined delay time.

2. The information processing apparatus according to claim 1,
wherein the power supply control unit
controls to supply power from the power supply unit to the predetermined load without the predetermined delay time in a case where it is determined that the power factor correction circuit is not to be turned on.

3. The information processing apparatus according to claim 1, further comprising:
a return button usable for returning the information processing apparatus to the power-saving state,
wherein the power supply control unit
determines to turn on the power factor correction circuit if the cause is a press performed on the return button.

4. The information processing apparatus according to claim 1, further comprising:
a facsimile unit configured to receive facsimile data,
wherein the power supply control unit
determines to turn on the power cause correction circuit in a case where the cause is reception of the facsimile data.

5. The information processing apparatus according to claim 1, further comprising:
a network interface unit configured to receive data from an external apparatus,
wherein the power supply control unit
determines to turn on the power factor correction circuit in a case where the cause is reception of a first type of data by the network interface and not to turn on the power factor correction circuit in a case where the cause is reception of a second type of data by the network interface.

6. The information processing apparatus according to claim 1, further comprising a printer unit configured to print an image on a sheet.

7. The information processing apparatus according to claim 6,
wherein the power control unit
determines to turn on the power factor correction circuit in a case where the cause is reception of a print job for causing the printer unit to execute printing.

8. An information processing apparatus, comprising:
a power supply unit having an ON/OFF switchable power factor correction circuit, the power supply unit being configured to supply power to a predetermined load in the information processing apparatus; and
a power supply control unit which:
in accordance with input of a signal for shifting the information processing apparatus to a power-saving state in which power supply from the power supply unit to the predetermined load is stopped, controls to stop power supply to the predetermined load in accordance with input of a signal for shifting the information processing apparatus to the power-saving state and then turns off the power factor correction circuit; and
in accordance with input of a signal for returning the information processing apparatus from the power-saving state, performs control such that power is supplied from the power supply unit to the predetermined load, wherein the power supply control unit determines whether the power factor correction circuit is to be turned on or not based on a cause of return of the information processing apparatus from the power-saving state.

9. An information processing apparatus, comprising:
a power supply unit having an ON/OFF switchable power factor correction circuit, the power supply unit being configured to supply power to a predetermined load in the information processing apparatus; and
a power supply control unit configured to control such that power is supplied from the power supply unit to the predetermined load in accordance with input of a signal for returning the information processing apparatus from a power-saving state stopping power supply to the predetermined load,
wherein the power supply control unit
controls to turn on the power factor correction circuit in a case where a cause of return of the information processing apparatus from the power-saving state is a first cause so that power can be supplied from the power supply unit to the predetermined load; and
controls not to turn on the power factor correction circuit in a case where a cause of return of the information processing apparatus from the power-saving state is a second cause so that power can be supplied from the power supply unit to the predetermined load.

10. The information processing apparatus according to claim 9,
wherein the power supply control unit
controls to turn on the power factor correction circuit in a case where the cause of return of the information processing apparatus from the power-saving state is the first cause so that power can be supplied from the power supply unit to the predetermined load after a lapse of a predetermined delay time.

11. The information processing apparatus according to claim 10,
wherein the power supply control unit
controls to supply power from the power supply unit to the predetermined load without the predetermined delay time in a case where the cause of return of the information processing apparatus from the power-saving state is the second cause.

12. The information processing apparatus according to claim 9,
wherein the power supply control unit
turns off the power factor correction circuit in accordance with input of a signal for shifting the information processing apparatus to the power-saving state.

13. The information processing apparatus according to claim 12,
wherein the power supply control unit
controls to stop power supply to the load in accordance with input of a signal for shifting the information processing apparatus to the power-saving state and then turns off the power factor correction circuit.

14. The information processing apparatus according to claim 9, further comprising:
a return button usable returning the information processing apparatus to the power-saving state,
wherein the first cause is a press performed on the return button.

15. The information processing apparatus according to claim 9, further comprising:
a facsimile unit configured to receive facsimile data,
wherein the first cause is reception of the facsimile data.

16. The information processing apparatus according to claim 9, further comprising:
a network interface unit configured to receive data from an external apparatus,
wherein the first cause is reception of a first type of data by the network interface, and the second cause is reception of a second type of data by the network interface.

17. The information processing apparatus according to claim 9, further comprising a printer unit configured to print an image on a sheet.

18. The information processing apparatus according to claim 17,
wherein the first cause is reception of a print job for causing the printer unit to execute printing.

19. A control method for an information processing apparatus including a power supply unit having an ON/OFF switchable power factor correction circuit, the power supply unit being configured to supply power to a predetermined load in the information processing apparatus, the method comprising:
shifting to a power-saving state stopping power supply to a predetermined load in the information processing apparatus;
controlling such that power is supplied from the power supply unit to the predetermined load in accordance with input of a signal for returning the information processing apparatus from the power-saving state;
determining whether the power factor correction circuit is to be turned on or not based on a cause of return of the information processing apparatus from the power-saving state; and
controlling to turn on the power factor correction circuit in a case where the determining determines that the power factor correction circuit is to be turned on so that power can be supplied from the power supply unit to the predetermined load after a lapse of a predetermined delay time.

20. A control method for an information processing apparatus including a power supply unit having an ON/OFF switchable power factor correction circuit, the power supply unit being configured to supply power to a predetermined load in the information processing apparatus, the method comprising:
shifting to a power-saving state stopping power supply to a predetermined load in the information processing apparatus;
receiving a signal for returning the information processing apparatus from the power-saving state;
controlling to turn on the power factor correction circuit in a case where a cause of return of the information processing apparatus from the power-saving state is a first cause so that power can be supplied from the power supply unit to the predetermined load; and
controlling not to turn on the power factor correction circuit in a case where a cause of return of the information processing apparatus from the power-saving state is a second cause so that power can be supplied from the power supply unit to the predetermined load.

21. A printing apparatus, comprising:
a processor;
a network controller, wherein the network controller communicates with the processor;
a power supply unit that has an ON/OFF switchable power factor correction circuit, and that supplies power to at least the processor and the network controller; and
a power supply control unit configured to perform a first control such that power is supplied from the power supply unit to the at least processor in a state where the power factor correction circuit of the power supply unit is turned off, in accordance with receiving, by the network controller, first type data which causes returning the printing apparatus from a predetermined power-saving state in which power is not supplied to the processor, and to perform a second control such that the power factor correction circuit in the power supply unit is turned on and then power is supplied from the power supply unit to at least the processor, in accordance with receiving, by the network controller, second type data which causes returning the printing apparatus from the predetermined power-saving state.

22. The printing apparatus according to claim 21, wherein in the second control performed by the power supply control unit, power is supplied from the power supply unit to at least the processor after a lapse of a predetermined period from when a signal for turning the power factor correction circuit off is asserted.

23. The printing apparatus according to claim 21, wherein the first type data is a predetermined inquiry.

24. The printing apparatus according to claim 21, wherein the second type data is a print job.

25. The printing apparatus according to claim 21, wherein the network controller receives data from an external apparatus, causes the power supply control unit to perform the first control based on the received data being the first type data, and causes the power supply control unit to perform the second control based on the received data being the second type data.

26. The printing apparatus according to claim 21, further comprising a print engine, wherein power is supplied to the print engine in accordance with receiving the second type data.

27. The printing apparatus according to claim 21, wherein the power supply unit receives AC (alternating current), converts the AC to DC (direct current), and supply the DC to the at least the processor and the network controller.

28. A printing apparatus, comprising:
a processor;
a predetermined load;
a network controller, wherein the network controller communicates with the processor;
a power supply unit that has an ON/OFF switchable power factor correction circuit, and that is capable of supplying power to at least the processor, the predetermined load, and the network controller; and
a power supply control unit that causes power to be supplied to the processor from the power supply unit in a state where the power factor correction circuit of the power supply unit is off and does not cause power to be supplied to the predetermined load from the power supply unit, based on receiving at least first predetermined type data by the network controller when power is not supplied to at least the processor and the predetermined load,
wherein, based on receiving second predetermined type data by the network controller when power is not supplied to at least the processor and the predetermined load, the power supply control unit turns on the power factor correction circuit of the power supply unit and then causes power to be supplied to the predetermined load from the power supply unit.

29. The printing apparatus according to claim 28, wherein, based on receiving the second predetermined type data by the network controller when power is not supplied to at least the processor and the predetermined load, the power supply control unit causes power to be supplied to the processor from the power supply unit.

30. The printing apparatus according to claim 28, wherein the first predetermined type data is a predetermined inquiry.

31. The printing apparatus according to claim 28, wherein the second predetermined type data is a print request.

32. The printing apparatus according to claim 28, wherein the power supply unit receives AC (alternating current), converts the AC to DC (direct current), and supply the DC to the at least the processor, the predetermined load, and the network controller.

33. A printing apparatus, comprising:
a power supply unit having an ON/OFF switchable power factor correction circuit, the power supply unit being configured to supply power to a predetermined load in the printing apparatus; and
a power supply control unit configured:
in accordance with input of a signal for shifting the printing apparatus to a power-saving state where power supply to at least the predetermined load is stopped, to stop power supply from the power supply unit to the predetermined load and then turn off the power factor correction circuit in the power supply unit; and
in accordance with input of a signal for returning the printing apparatus from the power-saving state, to supply power from the power supply unit to the predetermined load in a state where the power factor correction circuit of the power supply unit is turned off.

* * * * *